US007773807B2

(12) United States Patent
Grady et al.

(10) Patent No.: US 7,773,807 B2
(45) Date of Patent: Aug. 10, 2010

(54) SEED SEGMENTATION USING $L_\infty$ MINIMIZATION

(75) Inventors: Leo Grady, Yardley, PA (US); Ali Kemal Sinop, Princeton, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 776 days.

(21) Appl. No.: 11/789,747

(22) Filed: Apr. 25, 2007

(65) Prior Publication Data

US 2008/0056577 A1   Mar. 6, 2008

Related U.S. Application Data

(60) Provisional application No. 60/840,762, filed on Aug. 29, 2006.

(51) Int. Cl.
G06K 9/00 (2006.01)
G06K 9/34 (2006.01)
G06K 9/36 (2006.01)

(52) U.S. Cl. .................. 382/173; 382/180; 382/199

(58) Field of Classification Search ......... 382/128–132, 382/164, 172, 173, 180, 199, 218–220, 224, 382/228, 256, 266, 280, 282
See application file for complete search history.

(56) References Cited

U.S. PATENT DOCUMENTS

| 7,031,517 | B1 * | 4/2006 | Le et al. ..................... 382/173 |
| 7,187,800 | B2 * | 3/2007 | Hibbard ....................... 382/173 |
| 7,298,881 | B2 * | 11/2007 | Giger et al. .................. 382/128 |
| 7,327,880 | B2 * | 2/2008 | Tek .............................. 382/173 |
| 7,379,572 | B2 * | 5/2008 | Yoshida et al. .............. 382/128 |
| 7,471,827 | B2 * | 12/2008 | Xie et al. ..................... 382/173 |
| 7,519,220 | B2 * | 4/2009 | Aharon et al. ............... 382/173 |
| 7,596,275 | B1 * | 9/2009 | Richardson et al. ......... 382/224 |
| 7,627,175 | B2 * | 12/2009 | Le Clerc et al. ............. 382/173 |
| 7,689,038 | B2 * | 3/2010 | Zahniser ...................... 382/180 |
| 2003/0174872 | A1 * | 9/2003 | Chalana et al. .............. 382/128 |
| 2007/0025616 | A1 * | 2/2007 | Grady et al. ................. 382/173 |
| 2007/0253611 | A1 * | 11/2007 | Rousson et al. .............. 382/128 |
| 2008/0056577 | A1 * | 3/2008 | Grady et al. ................. 382/180 |

OTHER PUBLICATIONS

Y. Boykov and M.-P. Jolly. Interactive Organ Segmentation Using Graph Cuts. In *Medical Image Computing and Computer-Assisted Intervention*, pp. 276-286, Pittsburgh, PA, Oct. 2000.
Y. Boykov and M.-P. Jolly. *Interactive Graph Cuts* for Optimal Boundary & Region Segmentation of Objects in N-D Images. In *Proc. of ICCV 2001*, pp. 105-112, 2001.
Y. Boykov, O. Veksler, and R. Zabih. Fast Approximate Energy Minimization Via Graph Cuts. *IEEE PAMI*, 23(11):1222-1239, Nov. 2001.
L. Grady. Random Walks for Image Segmentation. To appear in *IEEE Pattern Analysis and Machine Intelligence*, 2006.

* cited by examiner

*Primary Examiner*—Amir Alavi
(74) *Attorney, Agent, or Firm*—Donald B. Paschburg; F. Chau & Associates, LLC

(57) ABSTRACT

A computer readable medium embodying instructions executable by a processor to perform a method for seeded image segmentation using $l_\infty$ minimization, the method including providing an image comprising a set of pixels, wherein a foreground seed label is given for at least one pixel of the image and a background seed label is given for at least another pixel of the image, determining an affinity function for every pair of neighbor pixels, solving the $l_\infty$ minimization, which assigns a probability to each pixel, labeling each pixel as foreground pixel or background pixel according to a threshold of the probability, and outputting the image including the segmentation labels.

8 Claims, 5 Drawing Sheets

FIG. 1

Given Foreground $F$ and Background $B$ Seeds, $q \in \mathbb{R}^+$

Let $x \leftarrow \arg\min \|C^{\frac{1}{2}} Ax\|_q^q =$ $$\left[ \sum_{e_{ij} \in E} (w_{ij}|x_i - x_j|)^q \right]^{\frac{1}{q}},$$

subject to $x(F) = 1$ and $x(B) = 0$.

Output Segmentation $s_i = \begin{cases} 1 & \text{if } x_i \geq \frac{1}{2}, \\ 0 & \text{if } x_i \leq \frac{1}{2}. \end{cases}$

FIG. 2

| Choice of $q$ | 1 | 2 | $\infty$ |
|---|---|---|---|
| Name | Graph Cut | Random Walk | This Algorithm |
| Objective Function | $\sum_{e_{ij} \in E} w_{ij}|x_i - x_j|$ | $\sum_{e_{ij} \in E} w_{ij}^2 |x_i - x_j|^2$ | $\max_{e_{ij} \in E} w_{ij}|x_i - x_j|$ |
| Obj. Func. Interpretation | Boundary Cut | Effective Conductance | Minimal Lipschitz Extension |
| Optimization Method | Maximum Flow | Solution of a Sparse Linear System | Shortest Path |

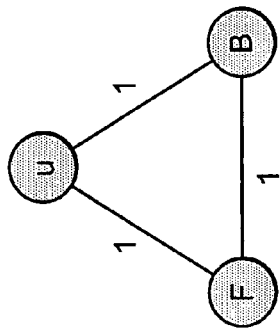

FIG. 3

| GRAPH CUTS (PRIOR ART) | RANDOM WALKER (PRIOR ART) | REGULARIZED $\ell\infty$ |
|---|---|---|
| 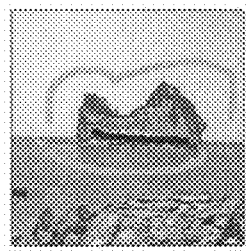 FIG. 8Ai | 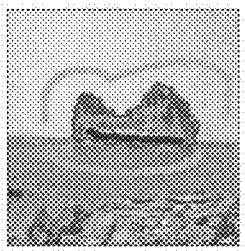 FIG. 8Bi | 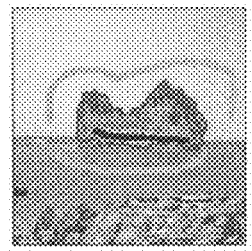 FIG. 8Ci |
| 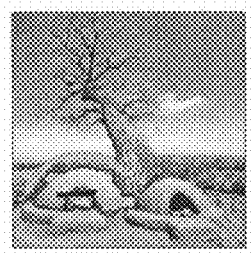 FIG. 8Aii | 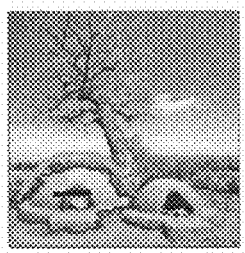 FIG. 8Bii | 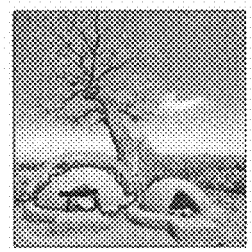 FIG. 8Cii |
| 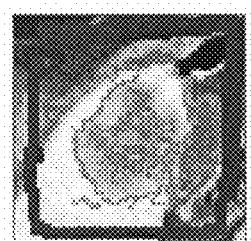 FIG. 8Aiii | 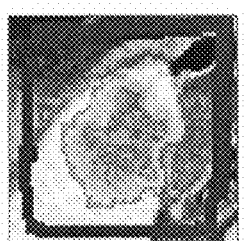 FIG. 8Biii | 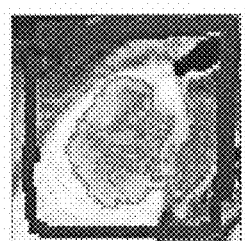 FIG. 8Ciii |
| 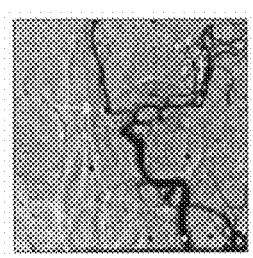 FIG. 8Aiv | 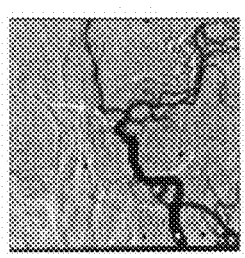 FIG. 8Biv | 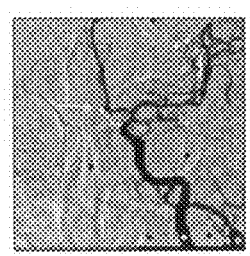 FIG. 8Civ |
| 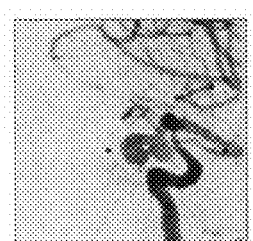 FIG. 8Av | 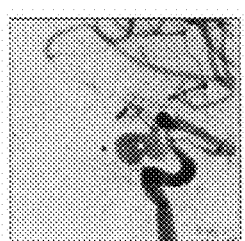 FIG. 8Bv | 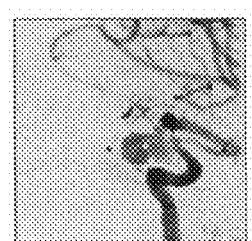 FIG. 8Cv |

SEED SEGMENTATION USING $L_\infty$ MINIMIZATION

CROSS-REFERENCE TO RELATED APPLICATION

This application claims priority to U.S. Provisional Application Ser. No. 60/840,762, filed on Aug. 29, 2006, which is herein incorporated by reference in its entirety.

BACKGROUND OF THE INVENTION

1. Technical Field

The present invention relates to image processing, and more particularly to a system and method for seeded image segmentation using $l_\infty$ minimization.

2. Discussion of Related Art

Image segmentation is an important problem in computer vision. Traditionally, segmentation methods have focused on unsupervised segmentation, grouping elements of the image according to a criterion such as homogeneity. Recently, supervised image segmentation methods have gained popularity, giving the user (or preprocessor) the ability to affect the segmentation as needed for a particular application.

Supervised segmentation methods typically come in three types: 1) The user is asked to provide pieces (e.g., points) of the desired boundary which are then completed by the method, 2) The user is asked to specify an initial boundary that is "close" to the desired boundary which evolves to the desired boundary or 3) The user is asked to provide an initial labeling of some pixels as belonging to the desired object to be segmented or to the background, after which the method completes the labeling for all pixels.

For supervised segmentation methods taking user provided initial labeling as input, the user provides a partial labeling of the image, known as seeds, after which a complete labeling is constructed. Correction of an erroneous segmentation is accomplished by specifying additional labels for the initializing partial labeling. Two exemplary seeded segmentation methods are the Graph Cuts and Random Walker methods. These methods treat the image as a graph and minimize certain energy functionals on this graph to produce a segmentation. Since these energy functionals are convex, it is possible to find the global optimum. Moreover, due to the method definitions on general graphs, they may be applied without modification to an image of arbitrary dimension.

In both of the Graph Cuts and Random Walker methods, a weighted graph representation of the image is constructed. Nodes of this graph correspond to pixels in the image and edges are placed between nearby pixels. The edge weights are determined by a similarity measure on these pixels such that an edge connecting two pixels with a high similarity should have a large weight and vice versa.

In the Graph Cuts method, the foreground/background seeds are treated as source/sink nodes for a max-flow/min-cut operation. Using a maxflow/min-cut method, a set of edges with the minimum total weight is found and then returned as the object boundary. A problem with the Graph Cut method is the "small cut" behavior. Since this method tries to minimize the total edge weights in the cut, it may return very small segmentations as a result of low contrast, a small number of seeds or noise. The minimum-cut criterion may also cause problems by returning solutions in which the boundary takes a "shortcut" over a protruded section of the object in an attempt to minimize boundary length.

In the Random Walker method, the edge weights are treated as probabilities (when normalized by node degree) of a particle at one node traveling to a neighboring node. Given seeds, one may then compare the probability that a particle initiating at any node (pixel) travels first to the foreground or background seeds and assign that pixel to the corresponding label. It is possible to determine these probabilities for each pixel analytically without any simulation of random walks. While the Random Walker achieves good segmentation in the presence of weak boundaries and is insensitive to seed point selection, it is subject to loose segmentation, for example, in the presence of image noise.

Therefore a need exists for an improved seeded segmentation method.

SUMMARY OF THE INVENTION

A computer readable medium embodying instructions executable by a processor to perform a method for seeded image segmentation using to minimization, the method including providing an image comprising a set of pixels, wherein a foreground seed label is given for at least one pixel of the image and a background seed label is given for at least another pixel of the image, determining an affinity function for every pair of neighbor pixels, solving the $l_\infty$ minimization, which assigns a probability to each pixel, labeling each pixel as foreground pixel or background pixel according to a threshold of the probability, and outputting the image including the segmentation labels.

BRIEF DESCRIPTION OF THE DRAWINGS

Preferred embodiments of the present invention will be described below in more detail, with reference to the accompanying drawings:

FIG. 1 is an illustration of a seeded image segmentation framework from which Graph Cuts (q=1), Random Walker (q=2) and $l_\infty$ minimization are special cases;

FIG. 2 is a comparison of the Graph cuts, Random walker and $l_\infty$ minimization methods;

FIG. 3 is a diagram illustrating that solutions to the q=1 and q=∞ cases may be achieved using different methods;

FIGS. 8Ai-v illustrate segmentation results for a Graph Cuts method on real images using an 8-connected lattice;

FIGS. 8Bi-v illustrate segmentation results for a Random Walker method on real images using an 8-connected lattice;

FIGS. 8Ci-v illustrate segmentation results for a regularized $l_\infty$ method on real images using an 8-connected lattice according to an embodiment of the present disclosure;

DETAILED DESCRIPTION OF EXEMPLARY EMBODIMENTS

According to an embodiment of the present disclosure, a method for seeded image segmentation uses an $l_\infty$ norm. The method for the $l_\infty$ optimization produces a segmentation that overcomes difficulties associated with the Graph Cuts or Random Walker methods.

Herein, a method for seeded image segmentation using $l_\infty$ minimization is described.

Referring now to the method for seeded image segmentation using $l_\infty$ minimization and concepts thereof; A graph includes of a pair G=(V, E) with vertices (nodes) v ∈ V and edges e ∈ E ⊆ V×V, with n=|V| and m=|E|. An edge, e, spanning two vertices, $v_i$ and $v_j$, is denoted by $e_{ij}$. A weighted graph assigns a value to each edge called a weight. The weight of an edge, $e_{ij}$, is denoted by $w(e_{ij})$ or $w_{ij}$ and is assumed here to be nonnegative. The following will also assume that the graph is connected and undirected (i.e., $w_{ij}=w_{ji}$). Herein, an 8-connected lattice is employed as a neighborhood structure. Each node may be identified with a pixel (2D) or voxel (3D), although nodes could be otherwise identified with groups of pixels/voxels.

Figure 9:
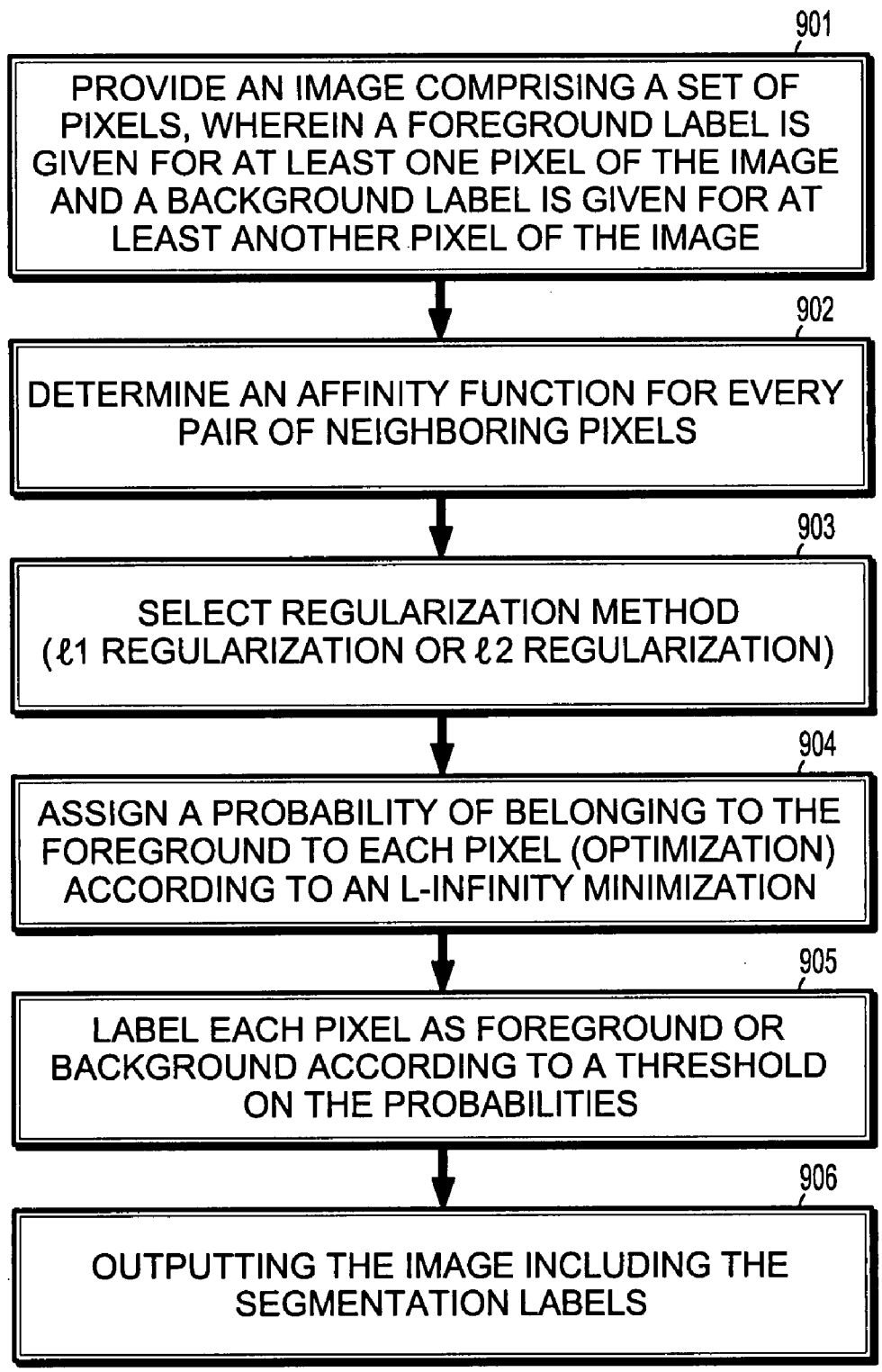
FIG. 9 is a flow chart of a method according to an embodiment of the present disclosure.

Referring to FIG. 9, consider a seeded image segmentation using $l_\infty$ minimization on an image domain, V, written as A: assume that a set of pixels, F, labeled foreground and a set of pixels, B, and labeled background, such that F, B⊆V, F∩B=0 are given (e.g., interactively or via a preprocessor) 901; find a solution to $$\min_{s.t.} \|C^{\frac{1}{2}} Ax\|_q^q = \left[\sum_{e_{ij} \in E} (w_{ij}|x_i - x_j|)^q \right]^{\frac{1}{q}}, \quad (1)$$

$$x_F = 1,$$
$$x_B = 0.$$

[for q=∞] (s.t. ("such that")) where A is the m×n node-edge incidence matrix defined as $$A_{e_{ij}v_k} = \begin{cases} +1 & \text{if } i = k, \\ -1 & \text{if } j = k, \\ 0 & \text{otherwise}, \end{cases} \quad (2)$$

and the m×m matrix C is the constitutive matrix, which is a diagonal matrix with the square weights of each edge along the diagonal 902; assign a set of segmentation labels 904/903/905, s: V ↦ {0,1} such that $$s_i = \begin{cases} 1 & \text{if } x_i \geq \frac{1}{2}, \\ 0 & \text{if } x_i < \frac{1}{2}. \end{cases} \quad (3)$$

; and output the image including the segmentation labels 906, for example, the output may be a display of a segmented image, an output to a computer readable media, etc.

An example of the method is summarized in FIG. 1. Note that the above formulation could be interpreted from a continuous perspective in which (1) is replaced by $$\min \|\nabla \psi\|_q^q \quad (4)$$

where the sets F and B represent internal Dirichlet boundary conditions and the gradient operator is modified by an inhomogeneous metric tensor that changes spatially in response to intensity changes.

For graph based segmentation methods the edge weights may encode image intensity changes. A weighting function in these methods can be given as $$w_{ij} = \exp(-\sqrt{\beta|g_i-g_j|^2 + |h_i-h_j|^2}), \quad (5)$$

where $g_i$ indicates the image intensity at pixel i, $h_i$ indicates the spatial position of pixel i and β is a free parameter. In the context of (4), these weights would be equivalent to a spatially varying metric. Note that pixel affinity could equally be derived from changes in color, texture, etc.

The method given by FIG. 1 leaves only one remaining choice: the value of q (parameter q is the p—norm of the gradients). Herein, it is shown that the choice of q=1 leads to the Graph Cuts method and the choice of q=2 leads to the Random Walker method. This situation is summarized in FIG. 2. Following the justification of the above statements, the choice q=∞ is described.

Referring to the q=1 case—Graph Cuts; If q=1 is substituted into (1), and the method given by FIG. 1 gives the solution of:

$$\min_{s.t.} |C^{\frac{1}{2}} Ax| = \sum_{e_{ij} \in E} w_{ij}|x_i - x_j|, \quad (6)$$

$$x_F = 1,$$
$$x_B = 0.$$

The dual formulation of (6) is $$\max y_B, \text{ s.t. } A^T y = \delta_F y_F + \delta_B y_B, 0 \leq y_{ij} \leq w_{ij} \, \forall e_{ij} \in E, \quad (7)$$

where $\delta_{F,B}$ are vectors of length n with 1's in entries corresponding to foreground and background seeds respectively, and zeros elsewhere.

Upon closer inspection, it can be seen that (7) is the maximum-flow problem, where $y_B$ is the total flow, subject to the flow conservation principle. Therefore, formulation (1) gives rise to the min-cut/max-flow problem for q=1. The primal problem (6) also demonstrates the minimum cut problem— Minimize a weighted cut, represented by x, between terminals F and B. The solution of (6) will be a binary solution, $x_i \in \{0,1\}$, due to the totally unimodular property of the min-cut problem. Since the solution of (6) will be binary, the thresholding given by FIG. 1 (see also FIG. 9, block 905) will have no consequence, and the labeling (see FIG. 9, block 905) will be equal to the optimal solution of (6). As a result, the Graph Cuts image segmentation method gives the same solution as the method given by FIG. 1 when q=1.

Referring to the q=2 case—Random Walker; The q=2 case corresponds to the Random Walker segmentation method. For q=2, (1) becomes $$\min_{s.t.} \|C^{\frac{1}{2}} Ax\|_2^2 = \sum_{e_{ij} \in E} w_{ij}^2 (x_i - x_j)^2 \quad (8)$$

$$= x^T A^T CAx,$$

$$x_F = 1,$$

$$x_B = 0.$$

A minimization of this form is described in the Random Walker formulation for a case of two labels. Solution of (8) yields the desired Random Walker probabilities, which are then thresholded to produce the foreground/background labeling 905. Therefore, the Random Walker image segmentation method with two labels gives exactly the same solution as the method given by FIG. 1 when q=2.

Hence, the method given by FIG. 1 is shown to produce the Graph Cuts and Random Walker segmentation solutions when q=1 and q=2, respectively.

Turning now to the q=∞ case; If q→∞, (1) becomes $$\lim_{q \to \infty} \sqrt[q]{\sum_{e_{ij} \in E} w_{ij}^q |x_i - x_j|^q} = \frac{\max_{e_{ij} \in E} w_{ij} |x_i - x_j| \lim_{q \to \infty}}{\sqrt[q]{\sum_{e_{ij} \in E} \left(w_{ij} \frac{|x_i - x_j|}{\rho}\right)^q}} \quad (9)$$

$$= \rho.$$

Consequently, the overall optimization problem 904 may be written as $$\min \max_{e_{ij} \in E} w_{ij} |x_i - x_j|, \; st \; x_F = 1, x_B = 0. \quad (10)$$

This form is a combinatorial formulation of a minimal Lipschitz extension.

In the following description, let u ⇝ v denote a path in G from node u ∈ V to v ∈ V. Also, let $\rho = \max_{e_{ij} \in E} w_{ij}|x_i - x_j|$ for a solution x to (10).

For any path π: F ⇝ v, we have the inequalities:

$$\sum_{e_{ij} \in \pi} |x_i - x_j| \geq |x_F - x_B| = 1, \quad (11)$$

$$\sum_{e_{ij} \in \pi} |x_i - x_j| \leq \sum_{e_{ij} \in \pi} w_{ij}^{-1} \rho. \quad (12)$$

Combining these two inequalities yields $$\rho \geq \left(\sum_{e_{ij} \in \pi} w_{ij}^{-1}\right)^{-1}, \; \forall \; \pi: F \leadsto B. \quad (13)$$

A maximum lower bound for ρ is attained with the shortest path between a foreground and background seed over the reciprocal weights ($w_{ij}^{-1}$).

Let $d_i^F$ and $d_i^B$ denote the shortest path length from node $v_i \in V$ to a foreground and background node using reciprocal weights respectively.

Theorem 1. Let x be defined as $$x_i = \min\{\rho d_i^B, 1\}. \quad (14)$$

This potential vector is an optimal solution for (10).

Proof. Begin by checking the boundary conditions given in (10).

$x_i = 1$, $i \in F$. Since $\rho^{-1} \leq d_i^B$ for all $i \in F$, $\rho d_i^B \leq 1$, which implies $x_i = 1$.

$x_i = 0$, $i \in B$. For all $i \in B$, $d_i^B = 0$, therefore $x_i = 0$.

$w_{ij}|x_i - x_j| \leq \rho$. Without loss of generality, assume $x_i \geq x_j$, which implies that $d_i^B \geq d_j^B$.

If $x_j = 1$, then $x_i = 1$. Therefore, this property is readily satisfied. Assume otherwise. It is known that $d_i^B - d_j^B \leq w_{ij}^{-1}$ by the shortest path property. So, we have $$w_{ij}(x_i - x_j) \leq w_{ij}(\rho d_i^B - \rho d_j^B) \leq \rho.$$

A practical consequence of Theorem 1 is that the potential vector x may be determined in O(m+n log n) time by finding $d_i^B$ for each node, which needs a single source (treating all nodes in F as a single node) all shortest paths computation. Although the above discussion offers a simple, efficient method of finding an optimal solution to (10), it should be noted that this solution may be achieved using different methods.

FIG. 3 illustrates to the relationship between the q=1 and q=∞ cases. F is the foreground node (set to unity), B is the background node (set to zero). The remaining node, u, may take any value ranging between [0, 1] without affecting the objective function in (1). For this reason, regularizing the q=∞ case with an $l_1$ term does not remove the degeneracy and therefore an $l_2$ regularizer is used. Each edge has unity weight.

Additionally, the situation in FIG. 3 illustrates the degeneracy of the $l_1$ minimization of (6) 904, as well. In this graph, the value of $x_u$ can take any value between 0 and 1 without affecting the optimum of (10) or (6). Specifically, for any $x_u \in [0,1]$, $l_1(x)=2$ and $l_\infty(x)=1$. Hence, there exists an infinite number of solutions for these problems and some regularization 903 is needed to obtain a unique solution. Regardless of the regularization method employed, a surprising aspect of the solution in the $l_\infty$ case (with regards to the segmentation) is that some pixels are guaranteed to take the foreground label (have solution greater than ½) while others are guaranteed to take the background label (have solution less than ½). However, there remains an "ambiguous region" in which the method of regularization 903 determines the labeling 905. These regions may be determined for the $l_\infty$ method.

Theorem 2. Let ρ be the minimum value of $l_1$ (x). Then, for any potential vector x satisfying the boundary conditions in (10), with $w_{ij}|x_i - x_j| \leq \rho$, we have $$1 - \rho d_u^F 23 \; x_u \leq \rho d_u^B, \; \forall u \in V. \quad (15)$$

Proof For each node $u \in V$, let $\pi^F$ and $\pi^B$ denote the shortest paths from F and B to $u_i$ respectively. Then $$\sum_{e_{ij} \in \pi^F} (x_i - x_j) = 1 - x_u, \quad (16)$$

$$\sum_{e_{ij} \in \pi^F} (x_i - x_j) \leq \sum_{e_{ij} \in \pi^F} |x_i - x_j| \leq \rho d_u^F. \quad (17)$$

Combining these inequalities yields $$\rho d_u^F \geq 1 - x_u \Rightarrow x_u \geq 1 - \rho d_u^F. \quad (18)$$

The same mechanism allows for derivation of the other inequality.

These inequalities allow for finding lower and upper bounds on the segmentation areas. In any optimal solution to (10), x, a node u will always be classified as background if $$\rho d_u^B \leq \frac{1}{2}$$

and as foreground if $$\rho d_u^F \leq \frac{1}{2}.$$

This property allows one to put bounds on the possible segmentations in an efficient way. Additionally, these bounds demonstrate that the $l_1$ method avoids the shrinking problem associated with Graph Cuts.

The above analysis also provides another property of the solution to (10). This property is that the solution for any nodes along the shortest path from F to B is fixed, regardless of the regularization method employed. Formally, if $d_u^F + d_u^B = \rho^{-1}$, meaning that node u lies on a shortest path between F and B then $\rho d_u^B = \rho(\rho^{-1} - d_u^F) = 1 - \rho d_u^F$, which implies that $x_u$ is fixed. The ambiguous region is illustrated in FIG. 4 for three images: A blank (uniform) image, a weak boundary image and a natural image. Note that an 8-connected lattice was employed.

Various methods may be implemented for regularizing (10) to yield a unique solution, for example, the use of the other two norms ($l_1$ and $l_2$) as regularizers 903 for solving the degeneracy problem 904. Employing the other two norms as regularizers offers one avenue for combining the $l_\infty$ method with Graph Cuts or Random Walker.

$l_1$ Regularization 903: one choice for regularization finds a solution which, among all solutions with $l_\infty(x)$ minimum, also minimizes $l_1(x)$. This approach does not solve the degeneracy problem 904, as illustrated with FIG. 3. Here, it can be seen that all solutions minimizing $l_1(x)$ have $l_\infty(x)=1$ (the minimum), which means this solution may be obtained by other methods.

$l_2$ Regularization 903: A second exemplary approach to solving the degeneracy problem of (10) 904 can be found by searching for the solution which has the minimum $l_\infty$ value and minimizes $l_2$, if this is rewritten as an optimization problem:

$$\min x^T A^T C A x, \text{ s.t. } x_F = 1, x_B = 0, w_{ij}|x_i - x_j| \leq \rho, \forall e_{ij} \in E, \quad (19)$$

which is a quadratic programming problem. Note that since it is assumed that the graph G is connected, the addition of boundary conditions $x_F=1$ and $x_B=0$ cause $A^T C A$ to be positive definite. If it is further assumed that there exists two different optimal solutions, $x_1$ and $x_2$, then this implies that every $x = \theta x_1 + (1-\theta)x_2$, $\forall \theta \in (0,1)$, $\forall \theta \in (0,1)$ is also an optimal solution. Such a situation would imply that $A^T C A$ is still singular with the foreground and background constraints, which is a contradiction. Therefore the solution obtained by $l_2$ regularization is unique. This $l_2$ regularization is used to generate segmentation results for the $l_\infty$ method.

In order to solve the quadratic programming problem of (19), a conjugate gradient may be used based active set method. Results for $l_2$ regularized $l_\infty$ minimization problems are obtained using this solver.

Exemplary results for all three seeded image segmentation methods discussed in this paper: Graph Cuts ($l_1$ minimization), Random Walker ($l_2$ minimization), and $l_\infty$ minimization with $l_2$ regularization were determined. In all images, β is taken as $50^2$ for the edge weight computation given in (5). The behavior of these methods on synthetic images has been investigated as well as results with real images.

Turning to the study the behavior of these methods on weak boundary images. The weak boundary images are known to be solvable by both the Random Walker and Graph Cuts methods. Here, it is shown that the regularized $l_\infty$ minimization method shares this property. The segmentation results for a broken line are shown in FIGS. 5A-D. It can be seen that all three methods are able to complete the weak boundary. The minimum foreground and background segmentations allowed by $l_\infty$ minimization for this image are also shown in FIG. 4(b).

Referring to the dependency of segmentations on the seed locations; By its formulation, the Graph Cuts method is expected to be the least sensitive to seed placement, while the Random Walker method is expected to exhibit slightly more sensitivity to seed location. Since the $l_\infty$ minimization method depends on the shortest path between the foreground and background seeds, a greater sensitivity to seed location might be expected. The experiment in FIG. 6 confirms that this is indeed the case. Although the segmentation from the $l_\infty$ minimization is more affected by the seed placement, the segmentation is still qualitatively similar.

The effects of noise on the three methods has been compared. Uniform noise was added in the range [0, ¼] to the weak boundary image presented in FIGS. 5A-D. The results for this segmentation are given in FIGS. 7A-D. The $l_1$ method (Graph Cuts) is driven toward a small (minimal) cut as noise increases, while the $l_2$ method (Random Walker) is driven toward a segmentation resembling Voronoi cells. In contrast, the $l_\infty$ method maintains its solution.

For real images, it can be seen from the results in FIGS. 8Ai-Cv that the $l_\infty$ minimization method (FIGS. 8Ci-v) is able to give "tighter" segmentations than the Random Walker method (FIGS. 8Bi-v) without suffering from the shrinking property of Graph Cuts (FIGS. 8Ai-v). In order to shed more light on this case, FIG. 4C shows the ambiguous region in the $l_\infty$ method for the image in FIG. 8Ci. As shown in FIG. 4C, the minimum segmentation property of the $l_\infty$ minimization places minimal foreground segmentation in some areas declared as background by the Graph Cut method, thus avoiding the shrinking problem.

Figure 4A:
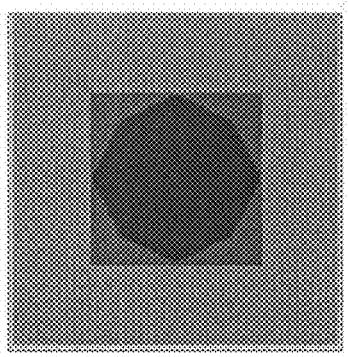
FIGS. 4A-C a segmentation boundary within a certain ambiguous regions.
Figure 4B:
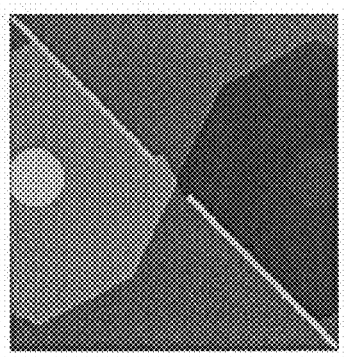
Figure 4C:
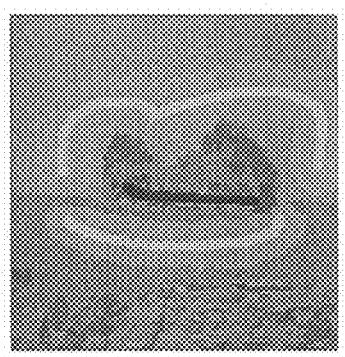
Figure 5A:
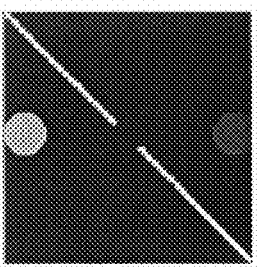
FIGS. 5A-D illustrate comparisons of three choices of q on a weak boundary problem.
Figure 5B:
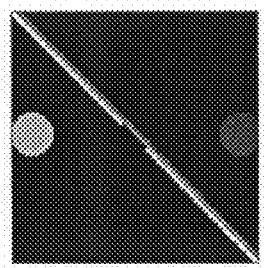
Figure 5C:
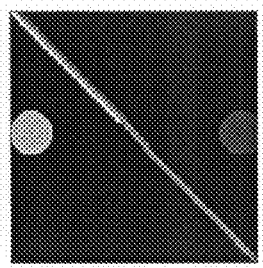
Figure 5D:
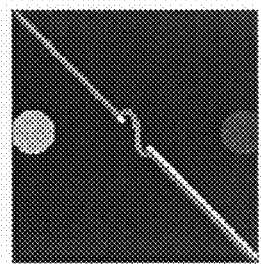
Figure 6A:
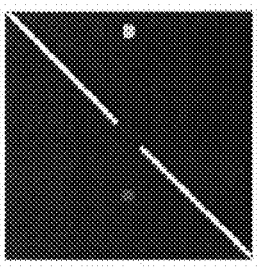
FIGS. 6A-D illustrate different choices of q reflecting different sensitivities to the seed locations.
Figure 6B:
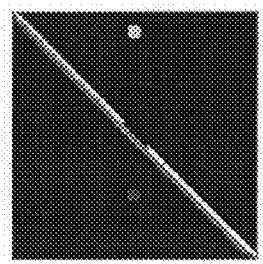
Figure 6C:
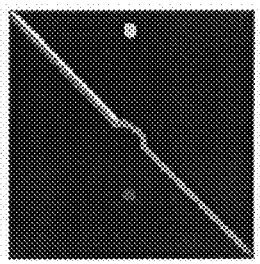
Figure 6D:
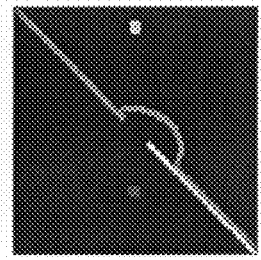
Figure 7A:
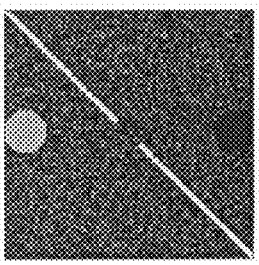
FIGS. 7A-D illustrate different choices of q reflect different sensitivities to image noise.
Figure 7B:
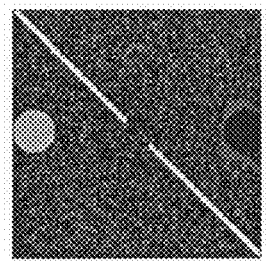
Figure 7C:
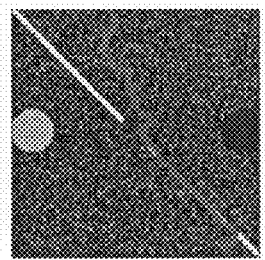
Figure 7D:
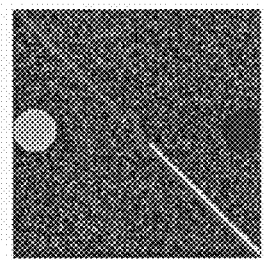

Referring to FIGS. 4A-C, although the $l_\infty$ algorithm produces a solution that may be achieved used other methods, the segmentation boundary must lie within a certain "ambiguous region" that is simple to compute. In these figures, the red region illustrates this "ambiguous region" in which the segmentation may take either a foreground or background label. Regardless of the regularizer, pixels inside the blue region must take a foreground label and pixels inside the green region must take a background label. Note that the blue and green regions always touch at a point that is halfway along the (weighted) shortest path between the foreground and background seeds. The saturated blue and green pixels indicate the foreground/background seed locations.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

Figure 10:
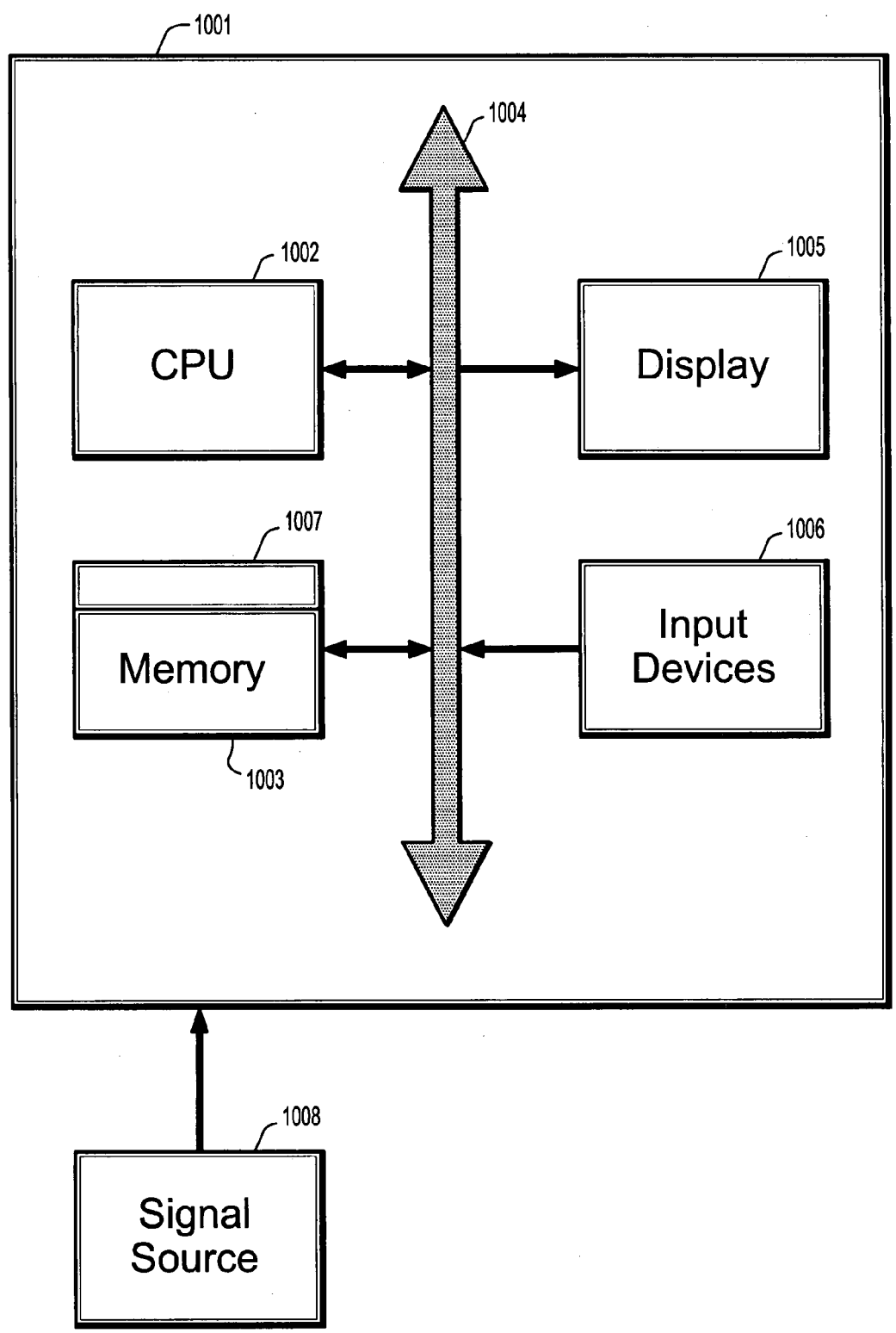
FIG. 10 is a system according to an embodiment of the present disclosure for performing seeded image segmentation using $l_\infty$ minimization.

Referring to FIG. 10, according to an embodiment of the present invention, a computer system 1001 for seeded image segmentation using $l_\infty$ minimization can comprise, inter alia, a central processing unit (CPU) 1002, a memory 1003 and an input/output (I/O) interface 1004. The computer system 1001 is generally coupled through the I/O interface 1004 to a display 1005 and various input devices 1006 such as a mouse and keyboard. The support circuits can include circuits such as cache, power supplies, clock circuits, and a communications bus. The memory 1003 can include random access memory (RAM), read only memory (ROM), disk drive, tape drive, etc., or a combination thereof. The present invention can be implemented as a routine 1007 that is stored in memory 1003 and executed by the CPU 1002 to process the signal from the signal source 1008. As such, the computer system 1001 is a general purpose computer system that becomes a specific purpose computer system when executing the routine 1007 of the present invention.

The computer platform 1001 also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

The seeded image segmentation given by the method given by FIG. 1 has been described which is based on the minimization of $l_q$ norms. It has been shown that two seeded image segmentation methods, Graph Cuts and Random Walker, correspond to the parameter choices of q=1 and q=2 in FIG. 1. Another case of q→∞ proved to be segmentation based on a minimal Lipschitz extension. Although the solution of this problem is degenerate, it has been shown that it is possible to produce a minimal and maximal segmentation, depending on the choice of regularization. In order to solve the associated degeneracy problem, regularization with $l_2$ may be used. The general method is able to find "tighter" segmentations than the Random Walker method while not suffering from the "small cuts" problem associated with the Graph Cuts method.

Having described embodiments for a system and method for seeded image segmentation using $l_\infty$ minimization, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed is:

1. A non-transitory computer readable medium embodying instructions executable by a processor to perform a method for seeded image segmentation using $l_\infty$ minimization, the method steps comprising:

providing an image comprising a set of pixels, wherein a foreground seed label is given for at least one pixel of the image and a background seed label is given for at least another pixel of the image;

determining an affinity function for every pair or neighbor pixels by the $l_\infty$ minimization;

solving the $l_\infty$ minimization, which assigns a probability to each pixel;

labeling each pixel as foreground pixel or background pixel according to a threshold of the probability; and outputting the image including the segmentation labels.

2. The method of claim 1, wherein the threshold is 0.5.

3. The method of claim 1, further comprising optimizing the probability according to a shortest path between the foreground seed label and the background seed label.

4. The method of claim 1, further comprising an $l_2$ regularization of the $l_\infty$ minimization.

5. The method of claim 1, wherein the $l_\infty$ minimization is written as $$\min \max_{i_{ij} \in E} w_{ij}|x_i - x_j| \text{ s.t. } x_F = 1, x_B = 0$$

wherein $w_{ij}$ is a weighting function, $e_{ij}$ is an edge between neighboring pixels i and j of a set E, and x is the probability of a foreground pixel F and a background pixel B.

6. The method of claim 1, wherein the outputting comprises at least one of displaying the image including the segmentation labels and storing the image including the segmentation labels to a computer readable medium.

7. A system for image segmentation comprising:

a source of an image to be segmented;

an input device for receiving foreground and background seed pixels of the image to be segmented;

a processor executing a instructions embodied in a computer readable medium for seeded image segmentation of the image using $l_\infty$ minimization and determining a segmentation of the image identifying a foreground portion and a background portion of the image; and a output device for receiving the segmentation determined by the processor, wherein the $l_\infty$ minimization is written as $$\min \max_{i_{ij} \in E} w_{ij}|x_i - x_j| \text{ s.t. } x_F = 1, x_B = 0$$

wherein $w_{ij}$ is a weighting function, $e_{ij}$ is an edge between neighboring pixels i and j of a set E, and x is the probability of a foreground pixel F and a background pixel B.

8. The system of claim 7, wherein the output device is one of a display for displaying the segmentation determined by the processor and the computer readable medium, wherein the computer readable medium stores the segmentation determined by the processor.

* * * * *